United States Patent
Sakima et al.

(10) Patent No.: US 9,302,673 B2
(45) Date of Patent: Apr. 5, 2016

(54) APPARATUS AND COMPUTER PROGRAM FOR CONTROLLING VEHICLE TRACKING TARGET VEHICLE

(71) Applicant: DENSO CORPORATION, Kariya, Aichi-pref. (JP)

(72) Inventors: Taku Sakima, Chiryu (JP); Yuusuke Matsumoto, Aichi-ken (JP); Syunya Kumano, Gothenburg (SE); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/594,429

(22) Filed: Jan. 12, 2015

(65) Prior Publication Data

US 2015/0197249 A1    Jul. 16, 2015

(30) Foreign Application Priority Data

Jan. 14, 2014  (JP) .................................. 2014-004264

(51) Int. Cl.
    *B60W 30/165*    (2012.01)
(52) U.S. Cl.
    CPC ......... *B60W 30/165* (2013.01); *B60W 2550/22* (2013.01); *B60W 2550/302* (2013.01); *B60W 2550/308* (2013.01)
(58) Field of Classification Search
    CPC ..................... B60W 30/165; B60W 2550/302; B60W 2550/22; B60W 2550/308; H04N 13/0239; H04N 13/0055; H04N 2013/0081; G08G 1/166; G08G 1/167; G06T 7/0075; G06T 2207/30256; G01S 11/12; G01C 11/06; B60R 1/00; B60R 2300/806; B60R 2300/105; B60R 2300/30; B60R 2300/302; B60R 2300/205; B60R 2300/8066; B60R 2300/107
    See application file for complete search history.

(56) References Cited

U.S. PATENT DOCUMENTS

| | | | | |
|---|---|---|---|---|
| 5,369,590 | A * | 11/1994 | Karasudani | 701/300 |
| 2003/0069695 | A1 * | 4/2003 | Imanishi et al. | 701/301 |
| 2005/0015203 | A1 * | 1/2005 | Nishira | 701/301 |

(Continued)

FOREIGN PATENT DOCUMENTS

| | | |
|---|---|---|
| JP | 2002-307972 | 10/2002 |
| JP | 2007-052730 | 3/2007 |

(Continued)

OTHER PUBLICATIONS

Office Action dated Nov. 17, 2015 in corresponding Japanese Application No. 2014-004264 with English translation.

*Primary Examiner* — Rodney Butler
(74) *Attorney, Agent, or Firm* — Harness, Dickey & Pierce, P.L.C.

(57) ABSTRACT

In an apparatus for controlling a vehicle to track another vehicle, a controller causes the controlled vehicle to track one of other vehicles as a target vehicle if one of the other vehicles meets a target-vehicle selecting condition. The target-vehicle selecting condition is required for selecting one of the other vehicles as the target vehicle. The controller recognizes an environment of a predicted travel road on which the controlled vehicle is predicted to travel using conditions of the predicted travel lane. The controller determines whether the predicted travel road allows lane changes based on the recognized environment of the predicted travel road. The controller adjusts the target-vehicle selecting condition based on a result of the determination.

18 Claims, 9 Drawing Sheets

(56) References Cited

U.S. PATENT DOCUMENTS

2012/0245833 A1* 9/2012 Zaitsu et al. .................. 701/117
2013/0054106 A1   2/2013 Schmüdderich et al.
2013/0151145 A1* 6/2013 Ishikawa ....................... 701/428
2014/0136015 A1* 5/2014 Hayakawa et al. ............... 701/1

FOREIGN PATENT DOCUMENTS

| | | |
|---|---|---|
| JP | 2008-046845 | 2/2008 |
| JP | 2013-045447 | 3/2013 |

* cited by examiner

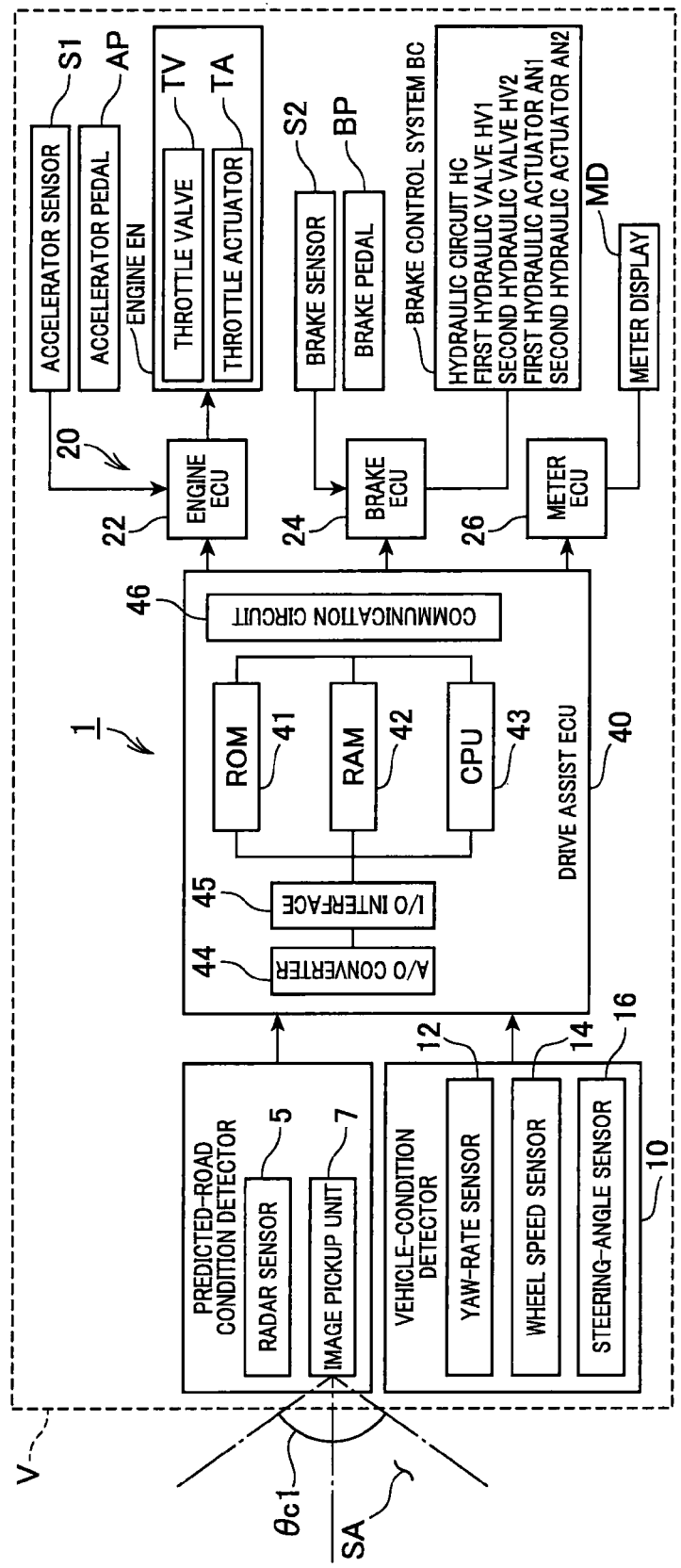

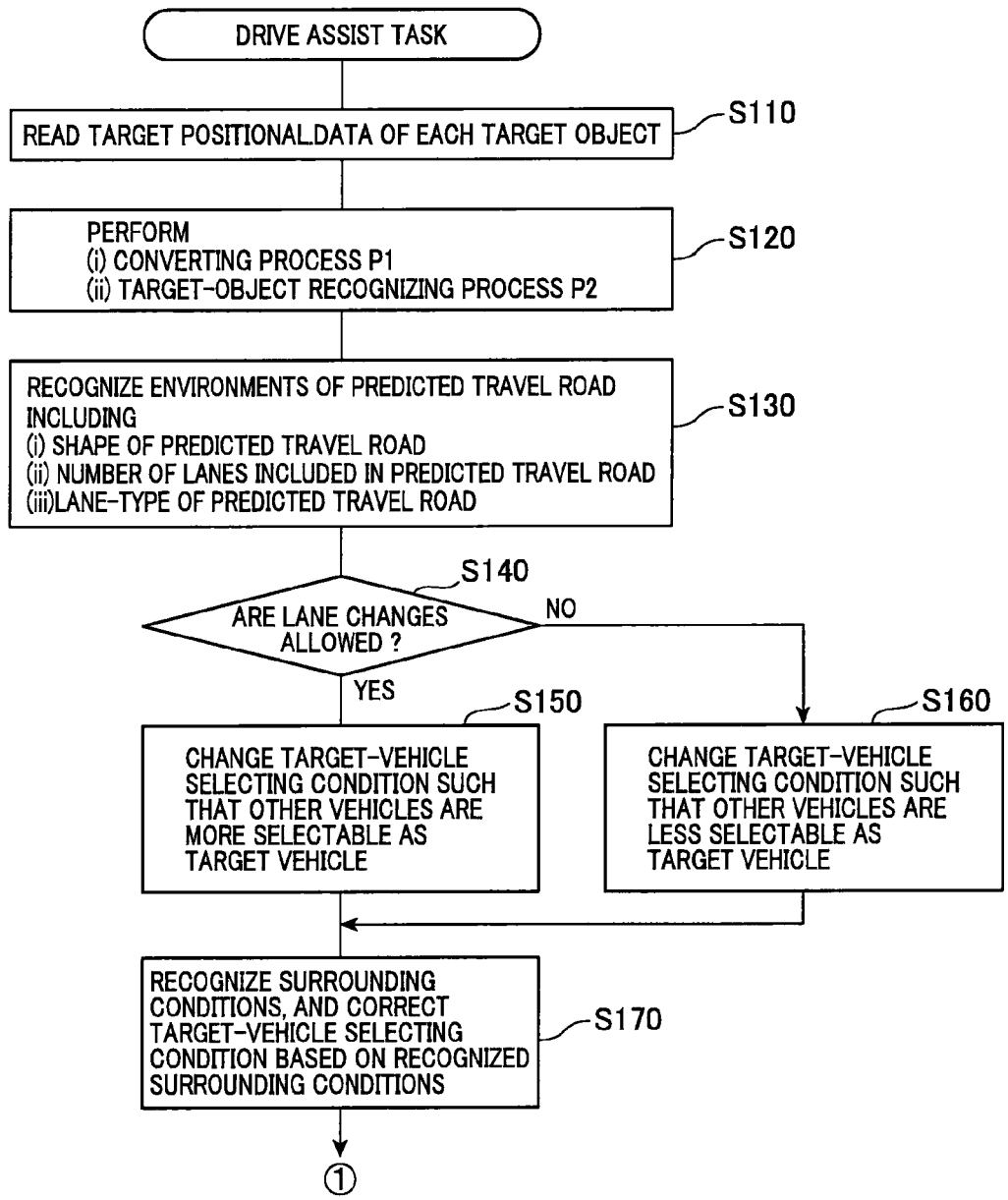

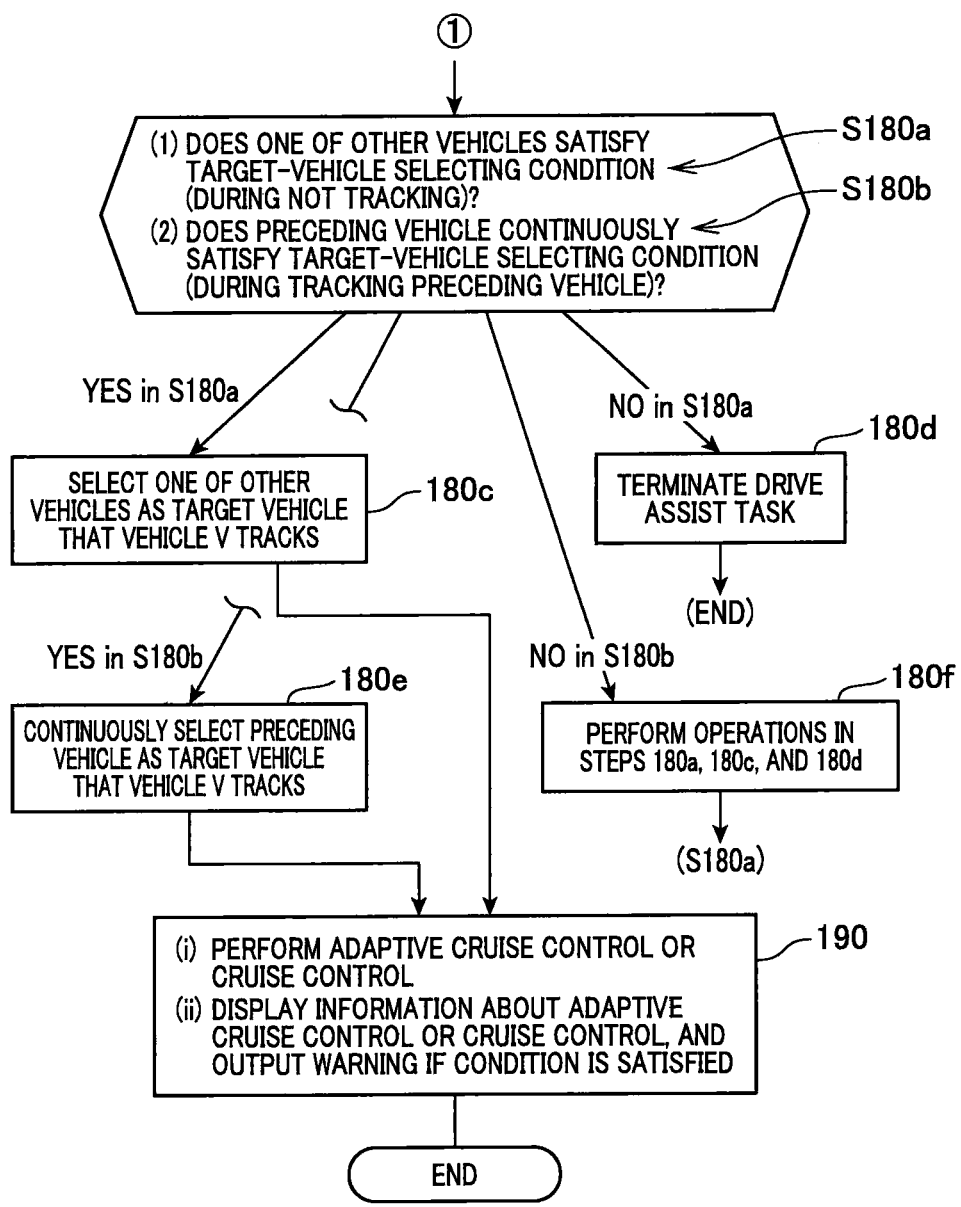

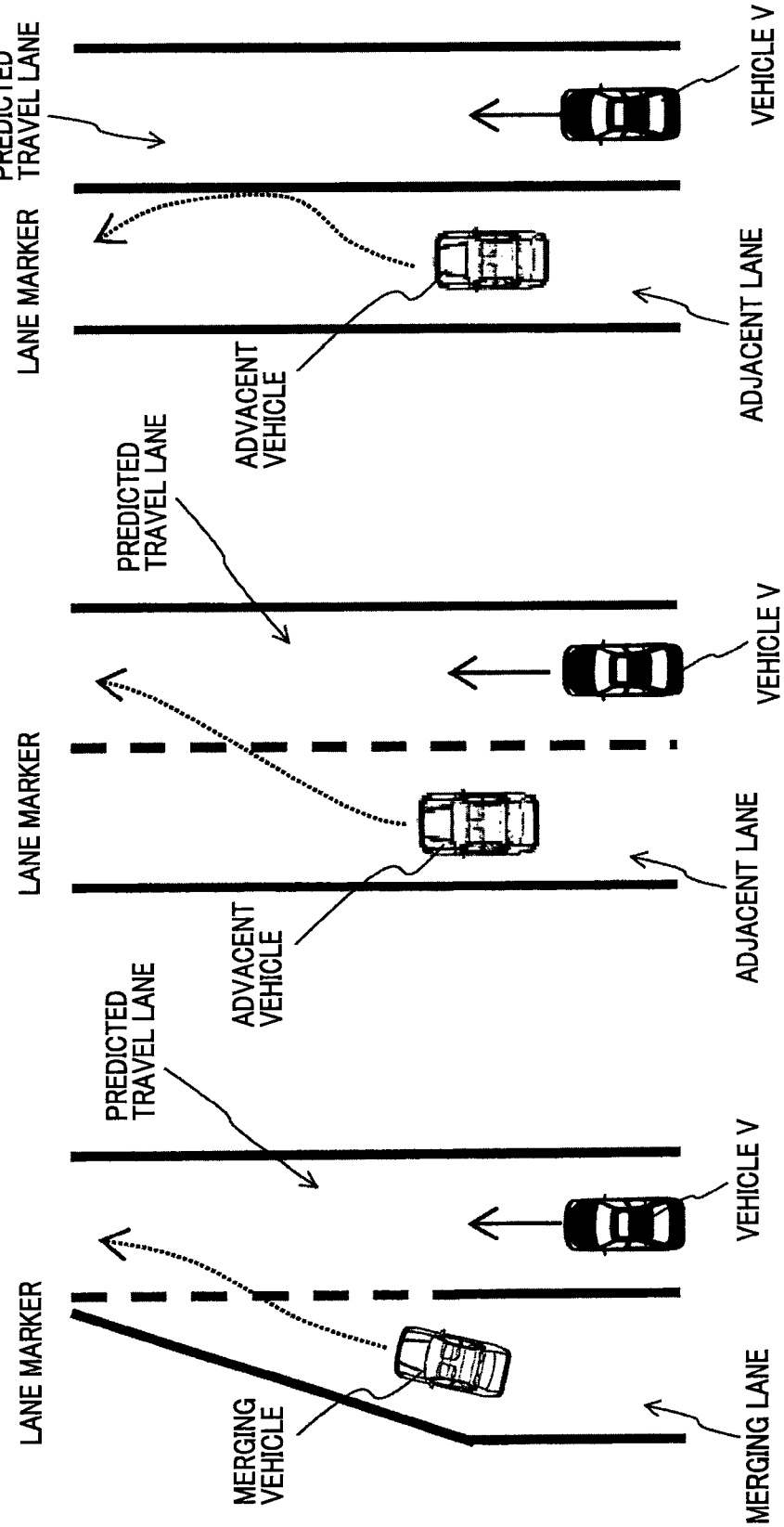

APPARATUS AND COMPUTER PROGRAM FOR CONTROLLING VEHICLE TRACKING TARGET VEHICLE

CROSS REFERENCE TO RELATED APPLICATIONS

This application is based on and claims the benefit of priority from Japanese Patent Application 2014-004264 filed on Jan. 14, 2014, the disclosure of which is incorporated in its entirety herein by reference.

TECHNICAL FIELD

The present disclosure relates to apparatuses and computer programs for controlling a vehicle tracking a target vehicle, such as a preceding vehicle.

BACKGROUND

There are known adaptive cruise control systems for controlling a distance from a first vehicle to a target second vehicle travelling ahead of the first vehicle, one of which is disclosed in Japanese Patent Application Publication No. 2002-307972.

The adaptive cruise control system disclosed in the Patent Publication is installed in a first vehicle for controlling the first vehicle; the first vehicle is running on a lane of a road. The adaptive cruise control system detects another vehicle running on a lane adjacent to the running lane of the first vehicle; the detected other vehicle will be referred to as an adjacent vehicle.

The adaptive cruise control system also predicts the behavior of the adjacent vehicle, and calculates the probability that the adjacent vehicle will make a lane-change from the adjacent lane to the running lane. When it is determined that the calculated probability is higher than a predetermined threshold value, the adaptive cruise control system determines that the adjacent vehicle is likely to cut into the running lane from the adjacent lane, and selects the adjacent vehicle as a target vehicle that the first vehicle, i.e. the controlled vehicle, tracks, i.e., follows up.

SUMMARY

There are some road environments where it is impossible for adjacent vehicles to cut into a lane on which a controlled vehicle is running.

For example, if there is a lane separator or an obstacle located between a lane on which a controlled vehicle having the adaptive cruise control system is running and a lane adjacent to the running lane of the controlled vehicle, it is physically impossible for an adjacent vehicle running on the adjacent lane to cut into the running lane of the controlled vehicle. As another example, if the controlled vehicle is running on a lane into which adjacent vehicles running on an adjacent lane are legally prohibited from cutting, it is also impossible for the adjacent vehicles to cut into the running lane.

From the viewpoint of these road environments, the adaptive cruise control system disclosed in the Patent Publication may erroneously detect an adjacent vehicle as a target vehicle if the adjacent vehicle has a behavior that wobbles toward the running lane although the adjacent vehicle is unscheduled to cut into the running lane.

That is, there may be a problem of low accuracy of determining an adjacent vehicle as a target vehicle that the controlled vehicle tracks.

In view of the circumstances set forth above, one aspect of the present disclosure seeks to provide apparatuses and computer programs, which are capable of addressing the problem.

Specifically, an alternative aspect of the present disclosure aims to provide such apparatuses and computer programs, each of which is capable of improving the accuracy of selecting another vehicle as a target vehicle that a controlled vehicle tracks.

According to a first exemplary aspect of the present disclosure, there is provided an apparatus for controlling a vehicle to track another vehicle. The apparatus includes a detector detecting other vehicles existing around the controlled vehicle; and a controller communicably connected to the detector. The controller is configured to (1) Cause the controlled vehicle to track one of the other vehicles as a target vehicle if one of the other vehicles meets a predetermined target-vehicle selecting condition, the predetermined target-vehicle selecting condition being required for selecting one of the other vehicles as the target vehicle (2) Recognize an environment of a predicted travel road on which the controlled vehicle is predicted to travel using conditions of the predicted travel road (3) Determine whether the predicted travel road allows lane changes based on the recognized environment of the predicted travel road (4) Adjust the target-vehicle selecting condition based on a result of the determination.

According to a second exemplary aspect of the present disclosure, there is provided a computer program product for an apparatus for controlling a vehicle to track another vehicle. The apparatus includes a detector detecting other vehicles existing around the controlled vehicle. The computer program product includes a non-transitory computer-readable storage medium, and a set of computer program instructions embedded in the computer-readable storage medium. The instructions cause a computer to (i) Cause the controlled vehicle to track one of the other vehicles as a target vehicle if one of the other vehicles meets a predetermined target-vehicle selecting condition, the predetermined target-vehicle selecting condition being required for selecting one of the other vehicles as the target vehicle (ii) Recognize an environment of a predicted travel road on which the controlled vehicle is predicted to travel using conditions of the predicted travel lane (iii) Determine whether the predicted travel road allows lane changes based on the recognized environment of the predicted travel road (iv) Adjust the target-vehicle selecting condition based on a result of the determination.

In each of the first and second exemplary aspects of the present disclosure, a corresponding one of the controller and computer adjusts the target-vehicle selecting condition based on a result of the determination of whether the predicted travel road allows lane changes based on the recognized environment of the predicted travel road.

For example, when it is determined that the predicted travel road do not allow lane changes, a corresponding one of the controller and computer changes the target-vehicle selecting condition to make it difficult for the other vehicles to be selected as the target vehicle when it is determined that the predicted travel road do not allow lane changes.

This makes it possible to, even if an adjacent vehicle travelling on a lane adjacent to a currently travelling lane of the controlled wobbles toward the currently travelling lane, reduce the possibility that the wobbling adjacent vehicle is erroneously selected as the target vehicle that the controlled vehicle tracks. This results in improvement of the accuracy of determining another vehicle as the target vehicle that the controlled vehicle tracks.

Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 1A is a block diagram schematically illustrating an example of the overall structure of a drive assist system according to an embodiment of the present disclosure;

FIG. 2A is a flowchart schematically illustrating an example of the first part of a drive assist task executed by a drive assist ECU illustrated in FIG. 1;

FIG. 2B is a flowchart schematically illustrating an example of the next part of the drive assist task;

FIG. 3A is a view schematically illustrating a first lane type of predicted travel road according to the embodiment;

FIG. 3B is a view schematically illustrating a second lane type of predicted travel road according to the embodiment;

FIG. 3C is a view schematically illustrating a third lane type of predicted travel road according to the embodiment;

Figure 5A:
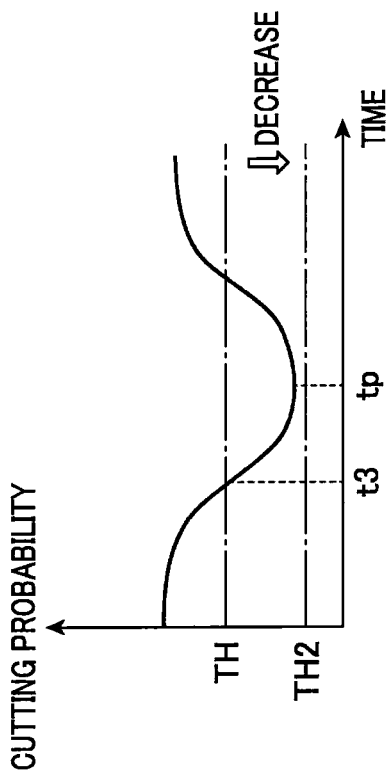
FIG. 5A is a graph schematically illustrating a predetermined standard change curve of a same-lane probability of an adjacent vehicle travelling on an adjacent lane adjacent to a predicted travel lane of a controlled vehicle while the adjacent vehicle is wobbling in the vehicle width direction according to the embodiment.
Figure 5B:
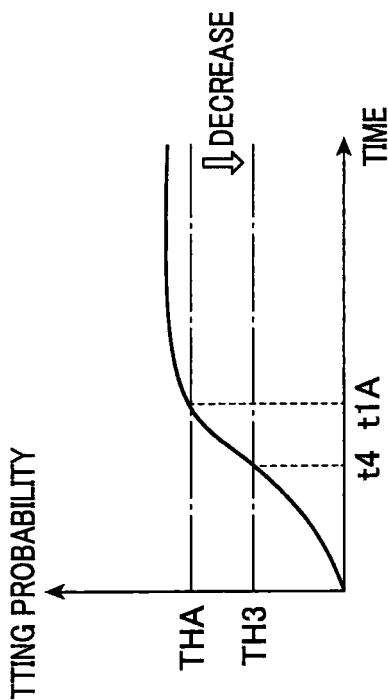
FIG. 5B is a graph schematically illustrating a predetermined standard change curve of the same-lane probability of a preceding vehicle travelling on a predicted travel lane of the controlled vehicle ahead of the controlled vehicle when the predicted travel lane is a curve lane according to the embodiment.
Figure 5C:
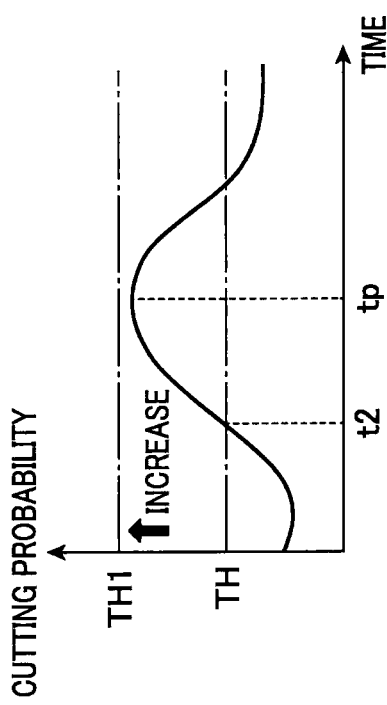
Figure 5D:
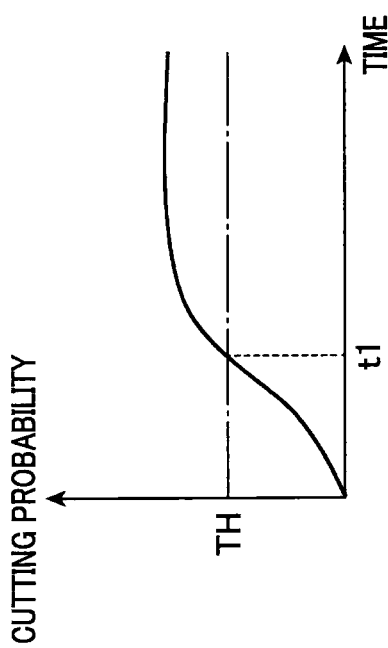
Figure 6:
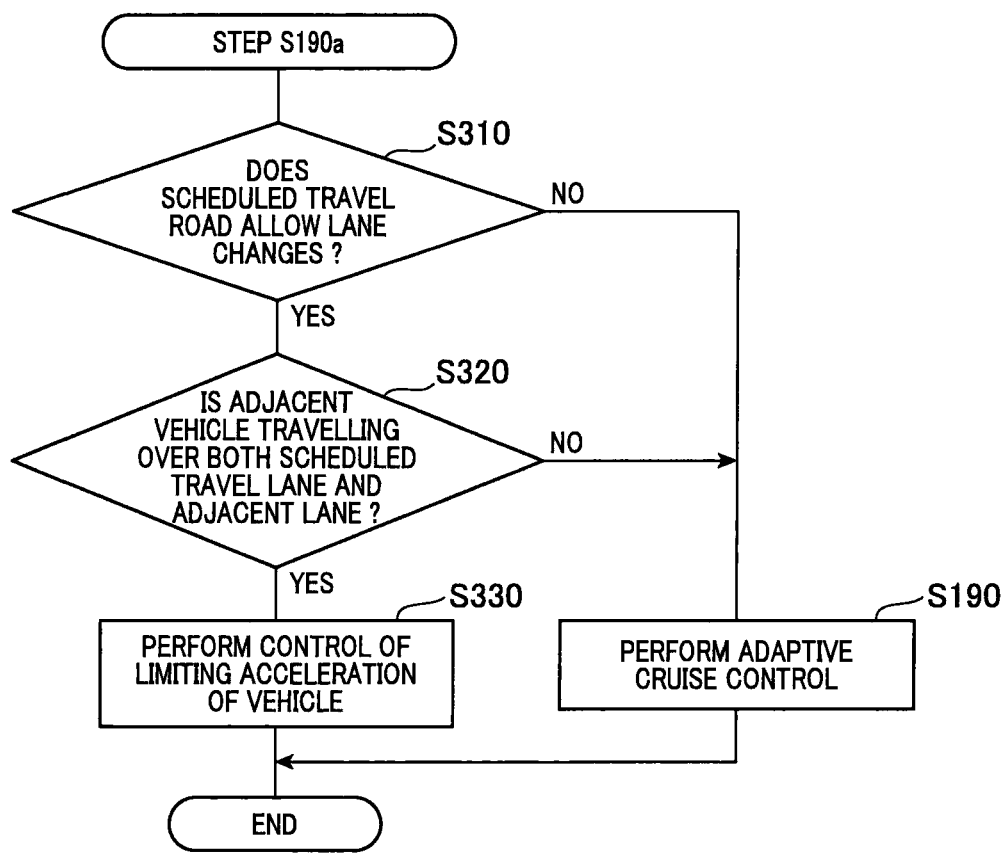
Figure 7:
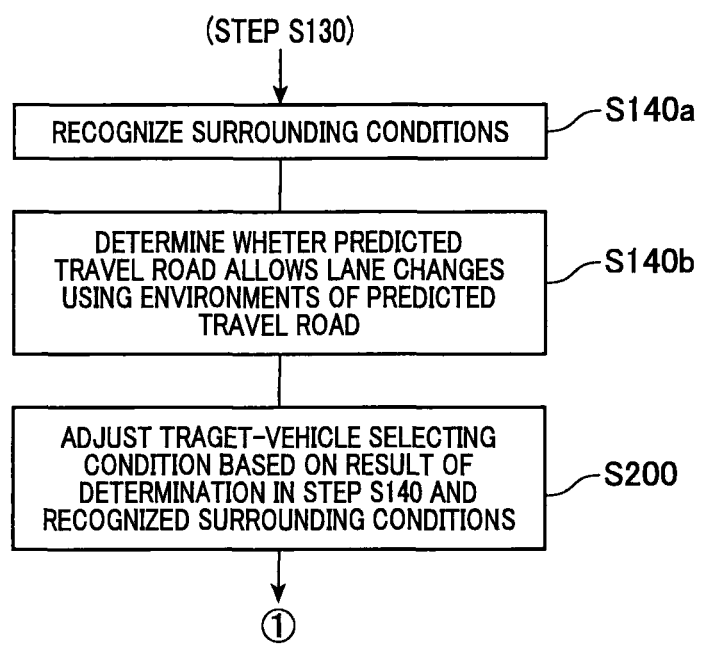

Each of FIGS. 5C and 5D is a graph schematically illustrating a predetermined standard change curve of the same-lane probability of a merging vehicle travelling a merging lane merging with a predicted travel lane of the controlled vehicle when the merging lane tries to merge with the predicted travel lane according to the embodiment;

FIG. 6 is a flowchart schematically illustrating an example of a drive assist task executed by the drive assist ECU according to a modification of the embodiment of the present disclosure; and FIG. 7 is a flowchart schematically illustrating an example of the first part of a modified drive assist task executed by the drive assist ECU according to another modification of the embodiment of the present disclosure.

DETAILED DESCRIPTION OF EMBODIMENT

An embodiment of the present disclosure will be described hereinafter with reference to the accompanying drawings.

A drive assist system 1 according to the embodiment is installed in a vehicle V for controlling the vehicle V, and configured to perform driving assist for a driver of the vehicle V. Particularly, the drive assist system 1 is configured to perform a cruise control task.

The cruise control task is designed to recognize the shape of a forward portion of a road on which the vehicle V is predicted, i.e. predetermined, to run, and control the speed of the vehicle V such that the speed is maintained within a predetermined range while the vehicle V is running on the forward portion of the road. A forward portion of a road on which the vehicle V is predicted to travel will be referred to as a predicted travel road. In other words, a currently travelling road of the vehicle V is normally predicted as the predicted travel road.

In addition, the cruise control task is designed to perform an adaptive cruise control task that (i) Specifies, as a target vehicle, one of other vehicles existing, i.e. travelling, adjacent to the vehicle V when one of the other vehicles meets at least one predetermined target-vehicle selecting condition (ii) When the target vehicle is cutting into the predicted travel road ahead of the vehicle V, keeps a distance from the vehicle V to the target vehicle to a predetermined target distance or thereabout.

Specifically, referring to FIG. 1A, the drive assist system 1 includes a predicted-road condition detector 3, a vehicle-condition detector 10, a vehicle control system 20, and a drive assist controller, i.e. a drive assist ECU (Electronic Control Unit), 40.

The predicted-road condition detector 3 is configured to detect information indicative of the conditions of a predicted travel road; the information will be referred to as predicted-road condition information. For example, the predicted-road condition detector 3 is equipped with a radar sensor 5 and an image pickup unit 7.

The radar sensor 5 is attached to, for example, the center portion of the front end of the vehicle V, and is operative to transmit probing waves, such as radar waves or laser waves, and receive echoes based on the transmitted probing waves. Based on the received echoes, the radar sensor 5 is operative to detect the positions of target objects that reflect the probing waves as the echoes.

For example, the radar sensor 5 according to this embodiment is designed as a laser radar. The radar sensor 5 has a laser output point with a center axis CA extending toward the forward side of the vehicle V. The radar sensor 5 transmits, from the laser output point, laser waves, i.e. laser beams, as the probing waves toward the forward side of the vehicle V to scan a sector area SA with a predetermined center angle θC in a horizontal direction, i.e. a vehicle width direction, in front of the vehicle V (see FIG. 1B). The sector area SA has a predetermined vertical width in the height direction of the vehicle V.

The radar sensor 5 receives echoes produced by reflection of at least some of the laser waves by target objects; each echo has a corresponding scan angle θ with respect to the center axis CA of the radar sensor 5 within the center angle θC of the scanned area SA.

For example, the radar sensor 5 stores therein a first time at which each of the laser waves is transmitted, and a second time at which an echo corresponding to at least some of the laser waves is received. Based on the information stored in the radar sensor 5, the radar sensor 5 measures an interval between the first time and the second time for each of the echoes. Then, the radar sensor 5 obtains, based on the measured interval for each of the echoes, the distance, i.e. the minimum distance, d of a corresponding target object with respect to the vehicle V, and the orientation, i.e. the scan angle θ, of a corresponding target object with respect to the center axis CA of the radar sensor 5 of the vehicle V.

Figure 1B:
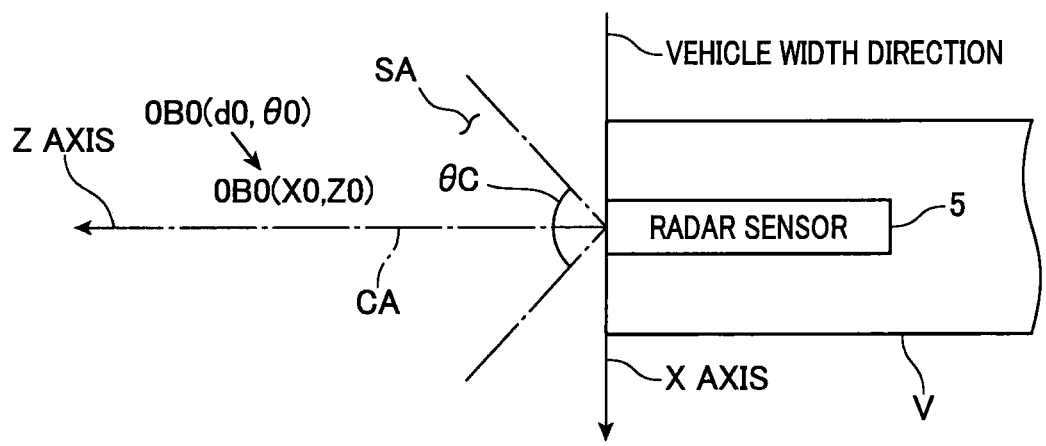
FIG. 1B is an enlarged view illustrating a polar coordinate system and a rectangular coordinate system defined in front of a radar sensor of the drive assist system.

That is, the distance d and the orientation (scan angle) θ of each target object corresponding to one of the echoes, which represents positional information of a corresponding target object, are obtained. The distance d and the orientation (scan angle) θ of each target object will be referred to as target positional data of a corresponding target object. The radar sensor 5 outputs the target positional data of each target object as some of the predicted-road information to the drive assist ECU 40. Note that, because the target positional data of each target object has the distance d and the orientation (scan angle) θ, the target positional data of each target object has a polar coordinate (d, θ) in a polar coordinate system. For example, a target object OB0 having a polar coordinate (d0, θ0) is illustrated in FIG. 1B.

Note that the radar sensor 5 is not limited to a laser radar for transmitting laser beams as probing waves. Specifically, the radar sensor 5 can be designed as a millimeter-wave radar for transmitting millimeter waves as probing waves, or as a sonar for transmitting ultrasonic waves as the probing waves.

The image pickup unit 7 is designed as, for example, a known camera device, and is attached to, for example, the center portion of the front end of the vehicle V. The image pickup unit 7 is operative to pick up images of a sector area SA1 with a predetermined center angle θc1 in the horizontal direction, i.e. the vehicle width direction, in front of the vehicle V. The sector area SA1 has a predetermined vertical width in the height direction of the vehicle V.

The center angle θc1 and the vertical width of the sector area SA1 are, for example, determined to monitor (1) A predicted travel road on which the vehicle V is predicted to travel (2) Road signs for vehicles predicted to travel on the predicted travel road.

Specifically, the image pickup unit 7 is operative to pick up, every unit time, an image of the sector area SA1 on and around the predicted travel road ahead of the vehicle V, and obtain the picked up images as some of the predicted-road condition information. Then, the image pickup unit 7 outputs the obtained predicted-road information to the drive assist ECU 40.

The vehicle-condition detector 10 is configured to detect various types of information representing the behavior of the vehicle V. For example, the vehicle-condition detector 10 is equipped with a yaw-rate sensor 12, wheel speed sensors 14, and a steering-angle sensor 16.

The yaw-rate sensor 12 is operative to output, to the drive assist ECU 40, a signal indicative of an angular velocity around a vertical axis of the vehicle V as a yaw rate γ of the vehicle V.

The wheel speed sensors 14 are attached respectively to the left-front wheel, the right-front wheel, the left-rear wheel, and the right-rear wheel of the vehicle V. Each of the wheel speed sensors 14 is operative to output a pulse whose leading or trailing edge occurs each time the axle of a corresponding wheel is turned at a predetermined angle. In other words, each of the wheel speed sensors 14 outputs, as a pulse signal, the train of pulses whose widths are defined based on the turning speed of the axle of a corresponding wheel.

The steering-angle sensor 16 is operative to output, to the drive assist ECU 40, a signal indicative of at least one of (i) A relative angle of a steering wheel of the vehicle V, i.e. a change in the steering angle of the steering wheel (ii) An absolute angle of the steering wheel with respect to the straight-ahead position of the steering wheel when the vehicle V is going straight ahead.

The signals output from the vehicle-condition detector 10 will be referred to as vehicle-condition signals.

The vehicle control system 20 includes ECUs for controlling various devices installed in the vehicle V. The vehicle control system 20 according to this embodiment includes at least an engine ECU 22, a brake ECU 24, and a meter ECU 26.

The engine ECU 22 is designed to control the operations of an internal combustion multicylinder engine EN of the vehicle V, which will be referred to simply as an engine EN. The engine EN is comprised of a throttle valve TV and a throttle actuator TA.

The throttle valve TV is mounted in an intake pipe of the engine EN and linked to the throttle actuator TA. The throttle actuator TA is communicably connected to the engine ECU 22, and linked to a driver-operable accelerator pedal AP of the vehicle V.

The throttle valve TV and the throttle actuator TA serve as means for controlling the amount of air entering, from the intake pipe, an intake manifold (or intake port) just ahead of each cylinder of the engine EN.

The vehicle control system 20 also includes various types of sensors required to control the operations of the engine EN and/or the vehicle V.

Specifically, the sensors include an accelerator sensor S1 and a brake sensor S2.

The accelerator sensor S1 is operative to measure a driver's operated (depressed) position or stroke of a driver-operable accelerator pedal AP of the vehicle V linked to the throttle valve TV, and output a signal indicative of the measured driver's operated position or stroke of the accelerator pedal AP to the engine ECU 22.

The brake sensor S2 is operative to measure a driver's operated (depressed) position or stroke of a brake pedal BP of the vehicle V, and output, to the brake ECU 24, a signal indicative of the measured driver's operated position or stroke of the brake pedal BP.

The engine ECU 22 is designed as, for example, a computer circuit including a CPU, a storage unit, such as a ROM and a RAM, and so on.

The engine ECU 22 is operative to perform (i) A first task of starting and stopping of the engine EN (ii) A second task of controlling proper quantity of fuel to be sprayed from an injector provided for each cylinder of the engine EN (iii) A third task of controlling proper ignition timing for an igniter provided for each cylinder of the engine EN (iv) A fourth task of controlling the rotational speed of the engine EN to thereby control the speed of the vehicle V.

Specifically, as the fourth task, the engine ECU 22 controls the throttle actuator TA based on the signal output from the accelerator sensor S1, to thereby control how the throttle valve TV opens the air passage inside the intake pipe toward each cylinder to adjust the quantity of intake air reaching each cylinder.

In addition, the engine ECU 22 is communicably connected to the drive assist ECU 40, and operative to control the throttle actuator TA according to instructions sent from the drive assist ECU 40 to thereby change torque produced by the engine EN.

The brake ECU 24 is designed as, for example, a computer circuit including a CPU, a storage unit, such as a ROM and a RAM, and so on. The brake ECU 24 is operative to control a brake control system BC including an ABS (Anti-lock Braking System). The brake control system BC includes a hydraulic circuit HC equipped with at least a first hydraulic valve HV1 and a second hydraulic valve HV2. The brake control system BC also includes at least first and second actuators AN1 and AN2 linked to the respective first and second hydraulic valves HV1 and HV2 and communicably connected to the brake ECU 24.

The first and second hydraulic valves HV1 and HV2 and the first and second actuators AN1 and AN2 serve as means for individually controlling hydraulic pressure to be applied to a brake for each of the wheels.

Specifically, the brake ECU 24 is operative to receive the signals output from the brake sensors S2, and receive the pulse signals output from the wheel speed sensors 14.

The brake ECU 24 is operative to determine whether there is a condition of each wheel indicative of impending wheel lock based on the received pulse signals from the wheel speed sensors 14.

If it is determined that there is a condition of a wheel indicative of impending wheel lock, the brake ECU 24 is operative to cause the first actuator AN1 to control the first hydraulic valve HV1 based on the signal output from the corresponding brake sensor S2. This reduces hydraulic pressure applied to a brake corresponding to the affected wheel, thus reducing the braking force to the affected wheel from a normal level to a predetermined low level.

If it is determined that the condition of the wheel is returned to a proper state after the reduction of hydraulic pressure, the brake ECU 24 is operative to cause the second actuator AN2 to control the second hydraulic valve HV2 based on the signal output from the corresponding brake sensor S2. This increases hydraulic pressure applied to the brake corresponding to the affected wheel, thus returning the braking force to the affected wheel from the predetermined low level to the normal level.

The brake ECU 24 is communicably connected to the drive assist ECU 40, and operative to control at least one of the actuators AN1 and AN2 according to instructions sent from the drive assist ECU 40 to thereby change hydraulic pressure applied to the brake for each wheel.

The meter ECU 26 is designed as, for example, a computer circuit including a CPU, a storage unit, such as a ROM and a RAM, and so on. The meter ECU 26 is communicably connected to the drive assist ECU 40 and other devices installed in the vehicle V. The meter ECU 26 is operative to receive various pieces of information sent from the drive assist ECU 26 and the other devices, and control how to display the pieces of information on one or more displays, such as one or more meter displays MD, installed in the vehicle V.

For example, the meter ECU 26 is operative to display the speed of the vehicle V and a rotational speed of the engine EN on the one or more meter displays MD. The meter ECU 26 is also operative to display how the drive assist ECU 40 performs a drive assist task for the vehicle V, and display specific steps of the drive assist task on the corresponding one or more meter displays MD.

The drive assist ECU 40 is designed as, for example, a computer circuit including at least a ROM 41, a RAM 42, a CPU 43, an A/D converter 44, an I/O interface 45, a communication circuit 46, and so on; the components 41 to 45 are communicably connected to each other via, for example, a bus. The drive assist ECU 40 is operative to perform various tasks including the drive control assist task.

Data and programs, which need be retained even if the drive assist ECU 40 is powered off, are stored in the ROM 41. The CPU 43 is configured to temporarily store programs and data in the RAM 42.

The A/D converter 44 is operative to receive the predicted-road condition information output from the predicted-road condition detector 3, and receive the vehicle-condition signals output from the vehicle-condition detector 10. The A/D converter 44 is operative to convert the predicted-road condition information and the vehicle-condition signals into digital data. The I/O interface 45 is operative to input the digital data to the CPU 43. The communication circuit 46 serves to permit the CPU 43 to communicate with the vehicle control system 20.

Specifically, in, for example, the ROM 41, a drive assist program consisting of instructions is stored; the drive assist program causes the CPU 43 to perform the drive assist task. For example, the drive assist task is designed to recognize the shape of a predicted travel road on which the vehicle V is predicted to travel, and perform drive assist control of the vehicle V based on the recognized shape of a predicted travel road.

The drive assist control of the vehicle V according to this embodiment includes selecting, i.e. determining, based on at least one predetermined target-vehicle selecting condition, one of other vehicles travelling adjacent to, i.e. around, the vehicle V as a target vehicle that the vehicle V tracks, i.e. follows up.

Next, the drive assist task carried out by the CPU 43 of the drive assist ECU 40 will be described hereinafter.

Note that the CPU 43 cyclically launches the drive assist program stored in the ROM 41 every preset interval, such as 100 ms, thus performing the drive assist task based on the drive assist program every preset interval.

When the drive assist program is launched, the CPU 43 reads digital data indicative of the predicted-road information sent from the predicted-road condition detector 3 via the A/D converter 44 and the I/O interface 45 in step S110. For example, in step S110 according to this embodiment, the CPU 43 reads the target positional data of each target object existing ahead of the vehicle V from the radar sensor 5. That is, the target positional data of each target object includes the distance d and the scan angle $\theta$ of a corresponding target object.

Next, in step S120, the CPU 43 converts the distance d and the scan angle $\theta$ of each target object, i.e. the polar coordinate (d, $\theta$) of the target positional data of each target object in the polar coordinate system, into rectangular coordinate (X, Z) in a rectangular, i.e. an X-Z, coordinate system. The X-Z coordinate system has a Z axis matching with the center axis CA of the radar sensor 5 and an X axis matching with the vehicle width direction passing through the radar output point of the radar sensor 5. For example, an origin coordinate in the X-Z coordinate system matches with the laser output point of the radar sensor 5 of the vehicle V.

For example, the CPU 43 converts the polar coordinate (d0, $\theta$0) of the target object OB0 in the polar coordinate system into a rectangular coordinate (X0, Z0) in the X-Z coordinate system (converting process P1).

In step S120, the CPU 43 also performs a target-object recognizing process P2 based on the rectangular coordinate (X, Z) of each target object existing in front of the vehicle V.

For example, in step S120, the CPU 43 classifies data items each having the rectangular coordinate (X, Z) into clusters CL1 . . . CLn (n is an integer equal to or more than 2); the distances among the data items included in each of the clusters CL1 to CLn are close to each other, i.e., are lower than a predetermined threshold. In step S120, the CPU 43 recognizes that the data items included in each of the clusters CL1 to CLn as data items obtained from a corresponding one of target objects TO1 to TOn. Then, in step S120, the CPU 43 obtains a center positional coordinate of each of the clusters CL1 to CLn, i.e. of each of the target objects TO1 to TOn, in the X-Z coordinate system. In step S120, the CPU 43 obtains a size, such as an area, a lateral width in the vehicle width direction, or the like of each of the clusters CL1 to CLn, i.e. of each of the target objects TO1 to TOn.

In addition, in step S120, the CPU 43 obtains a relative velocity of each of the target objects TO1 to TOn relative to the vehicle V. For example, the CPU 43 tracks the center positional coordinate of each of the clusters CL1 to CLn, i.e. each of the target objects TO1 to TOn, in steps S120 of several cycles of the drive assist task. Then, the CPU 43 obtains, based on the results of the tracking, i.e. the variations of the center positional coordinate of each of the clusters CL1 to CLn over time, the relative velocity of each of the target objects TO1 to TOn relative to the vehicle V.

In step S120, the CPU 43 determines, based on the size and relative velocity of each of the target objects TO1 to TOn, the type of a corresponding one of the target objects TO1 to TOn. Note that the type of each of the target objects TO1 to TOn represents what a corresponding one of the target objects TO1 to TOn is. For example, the CPU 43 determines one of the target objects TO1 to TOn as a roadside object, such as a guardrail, if the corresponding target object is a guardrail, and determines another one of the target objects TO1 to TOn as a preceding vehicle if the corresponding target object is a preceding vehicle.

Following step S120, the CPU 43 recognizes, based on the digital data indicative of the predicted-road information sent from the predicted-road condition detector 3, the environments of a predicted travel road on which the vehicle V is predicted to run in step S130. In step S130, the CPU 43 can read the digital data of the vehicle-condition signals output from the vehicle-condition detector 10, and recognize, based on the digital data of the vehicle-condition signals, the environments of the predicted travel road on which the vehicle V is predicted to run.

For example, the CPU 43 according to this embodiment recognizes, as the environments of the predicted travel road, at least the shape of the predicted travel road in step S130. In addition, the CPU 43 recognizes at least the number of lanes included in the predicted travel road, and the lane-type of the predicted travel road in step S130.

The CPU 43 according to this embodiment is programmed to estimate the shape of the predicted travel road using one of known estimating methods.

As a first known method, the CPU 43 estimates, based on the arrangement of the roadside objects, i.e. guardrails, recognized in step S120, the planar shape of the predicted travel road as the shape of the predicted travel road. The planar shape of the predicted travel road is a curved shape with a radius R of curvature. Then, the CPU 43 recognizes the curved shape with the radius R of curvature as the shape of the predicted travel road.

As a second known method, the CPU 43 estimates, based on the images picked up by the image pickup unit 7, the shape of the predicted travel road. As a third known method, the CPU 43 estimates, based on the vehicle-condition signals measured by the vehicle-condition detector 10, the shape of the predicted travel road.

In the second known method, the CPU 43 performs a known image recognition process to recognize a lane line, such as a colored lane line, painted on the predicted travel road using the images picked up by the image pickup unit 7. Then, the CPU 43 estimates, based on the recognized lane lines, the planar shape of the predicted travel road as the shape of the predicted travel road.

In the third known method, the CPU 43 recognizes, based on the pulse signal output from each of the wheel speed sensors 14, the turning speed of the axle of each wheel, and calculates, based on the turning speed of the axle of each wheel, the speed of the vehicle V. The CPU 43 recognizes, based on the signal output from the yaw-rate sensor 12, the yaw rate γ of the vehicle V. Then, the CPU 43 divides the speed of the vehicle V by the yaw rate γ of the vehicle V, thus calculating the radius R of curvature of the predicted travel road as the shape of the predicted travel road.

The CPU 43 can be configured to estimate the radius R of curvature of the predicted travel road as the shape of the predicted travel road using the combination of at least two of the first to third known methods. In this case, the CPU 43 can calculate an arithmetic average or a weighted average of values of the radius R of curvature of the predicted travel road calculated using at least two of the first to third known methods, and can estimate the arithmetic average or weighted average as the radius R of curvature of the predicted travel road.

For example, lane-types of predicted travel roads according to this embodiment include (i) A first lane-type that is a combination of a predicted travel lane on which the vehicle V is predicted to travel, and a merging lane merging with the predicted travel lane (see FIG. 3A)

(ii) A second lane-type that is a combination of a predicted travel lane on which the vehicle V is predicted to travel, and an adjacent lane from which a vehicle adjacent to the vehicle V can legally and physically make a lane-change to the predicted travel lane (see FIG. 3B)

(iii) A third lane-type that is a combination of a predicted travel lane on which the vehicle V is predicted to travel, and an adjacent lane from which a vehicle adjacent to the vehicle V is legally or physically unable to make a lane-change to the predicted travel lane (see FIG. 3C).

Note that a predicted travel lane for the vehicle V is the forward side of a currently travelling lane of the vehicle V.

In step S130, for example, the CPU 43 performs the known image recognition process to recognize a lane line, such as a colored lane line, painted on the predicted travel road using the images picked up by the image pickup unit 7. Then, the CPU 43 determines the lane-type of the predicted travel road based on the type of the recognized lane marker. That is, if it is determined that the type of the recognized lane marker is a dashed line (see FIG. 3A or 3B), the CPU 43 recognizes that an adjacent vehicle is enabled to make a lane-change in the predicted travel road. Otherwise, if it is determined that the type of the recognized lane marker is a solid line (see FIG. 3C), the CPU 43 recognizes that an adjacent vehicle is unable to make a lane-change in the predicted travel road.

In step S130, the CPU 43 can determine the lane-type of the predicted travel road using another known method. For example, the ROM 41 and/or RAM 42 store therein many template images of many road sings. The CPU 43 compares the images on and around the predicted travel road ahead of the vehicle V, picked up by the image pickup unit 7, with the template images, thus recognizing the descriptions of the road sings included in the picked up images. Then, the CPU 43 determines that the lane-type of the predicted travel road is the third-type lane if the description of one of the road signs shows NO OVERTAKING OR PASSING or MAINTAIN PRESENT LANE.

Following step S130, the CPU 43 determines whether the predicted travel road allows lane changes using the environments of the predicted travel road in step S140.

When it is determined that lane changes are allowed on the predicted travel road (YES in step S140), the CPU 43 changes, i.e. relaxes, the at least one target-vehicle selecting condition such that other vehicles running around the vehicle V are more selectable as a target vehicle that the vehicle V tracks in step S150. In other words, the CPU 43 changes the at least one target-vehicle selecting condition to thereby increase the probability of other vehicles running around the vehicle V being selected as a target vehicle that the vehicle V tracks in step S150.

The at least one target-vehicle selecting condition is at least one condition, in other words, at least one rule, required for selecting, i.e. specifying, one of other vehicles travelling around the vehicle V as a target vehicle that the vehicle V tracks. In other words, a selected one of the other vehicles travelling around the vehicle V satisfies the at least one target-vehicle selecting condition.

The at least one target-vehicle selecting condition can normally include, for example, a condition in which (1) One of the other vehicles around the vehicle V is travelling in the travelling direction of the vehicle V (2) The inter-vehicle distance between the vehicle V and one of the other vehicles around the vehicle V is the shortest in all the inter-vehicle distances between the vehicle V and the other vehicles.

Particularly, the at least one target-vehicle selecting condition according to this embodiment includes a condition that a same-lane probability of another vehicle travelling in a merging or adjacent lane, adjacent to the predicted travel lane of the vehicle V, or the same predicted travel lane ahead of the vehicle V is equal to or higher than a threshold probability. The same-lane probability of another vehicle travelling around the vehicle V is defined as a probability that the other vehicle will travel on the predicted travel lane of the vehicle V ahead of the vehicle V.

That is, when it is determined that the same-lane probability of one of the other vehicles is equal to or higher than the threshold probability, the CPU 43 selects the one of the other vehicles as a target vehicle that the vehicle V tracks.

Specifically, a value of the same-lane probability of each of the other vehicles travelling around the vehicle V can be calculated based on, for example, the relative relationships among (i) The position, for example, the origin coordinate of the X-Z coordinate system of the vehicle V (ii) The environments of the predicted travel road recognized in step S130

(iii) The position, i.e. the X-Z coordinate (X, Z), of each of the other vehicles.

In this embodiment, the CPU 43 is programmed to calculate a value of the same-lane probability of an adjacent vehicle travelling on a lane adjacent to the predicted travel lane of the vehicle V such that the value of the same-lane probability of the adjacent vehicle is increased with an increase of at least one of (1) The distance of movement of the adjacent vehicle close to the predicted travel lane of the vehicle V in the vehicle width direction (2) The lateral velocity of movement of the adjacent vehicle close to the predicted travel lane of the vehicle V in the vehicle width direction.

In this embodiment, the CPU 43 is programmed to calculate a value of the same-lane probability of a merging vehicle travelling on a merging lane adjacent to the predicted travel lane of the vehicle V such that the value of the same-lane probability of the merging vehicle is increased with an increase of at least one of (3) The distance of movement of the merging vehicle close to the predicted travel lane of the vehicle V in the vehicle width direction (4) The lateral velocity of movement of the merging vehicle close to the predicted travel lane of the vehicle V in the vehicle width direction.

Similarly, the CPU 43 is programmed to calculate a value of the same-lane probability of a preceding vehicle travelling on the predicted travel lane ahead of the vehicle V such that the value of the same-lane probability of the preceding vehicle is decreased with an increase of at least one of 1. The distance of movement of the preceding vehicle close to an adjacent lane adjacent to the predicted travel lane in the vehicle width direction 2. The lateral velocity of movement of the preceding vehicle close to the adjacent lane in the vehicle width direction.

Specifically, in step S150, the CPU 43 can reduce a value of the threshold probability to thereby cause other vehicles, such as adjacent vehicles or merging vehicles, running ahead of the vehicle V are more selectable as the target vehicle that the vehicle V tracks. In step S150, the CPU 43 can reduce a value of the threshold probability by a predetermined value.

After completion of the operation in step S150, the drive assist task proceeds to step S170.

Otherwise, when it is determined that the predicted travel road does not allow lane changes (NO in step S140), the CPU 43 changes, i.e. tightens, the at least one target-vehicle selecting condition such that other vehicles running around the vehicle V are less selectable as a target vehicle that the vehicle V tracks in step S160. In other words, the CPU 43 changes the at least one target-vehicle selecting condition to thereby make it difficult for other vehicles to be selected as a target vehicle that the vehicle V tracks.

Specifically, in step S160, the CPU 43 can increase a value of the threshold probability to thereby cause other vehicles, such as adjacent vehicles or merging vehicles, running ahead of the vehicle V to be less selectable as the target vehicle that the vehicle V tracks. In step S160, the CPU 43 can increase a value of the threshold probability by a predetermined value.

After completion of the operation in step S160, the drive assist task proceeds to step S170.

In step S170, the CPU 43 recognizes surrounding conditions, i.e. surrounding traffic conditions, around the predicted travel road for example using (1) The results of the operations in the previously described steps S110 to S150 or steps S110 to S114 and S160

(2) Digital data indicative of the predicted-road information sent from the predicted-road condition detector 3 and/or (3) Digital data of the vehicle-condition signals output from the vehicle-condition detector 10.

Then, in step S170, if necessary arises, the CPU 43 corrects the at least one target-vehicle selecting condition for at least one of other vehicles travelling around the vehicle V based on the recognized surrounding conditions around the predicted travel road.

The surrounding conditions around the vehicle V according to this embodiment include the conditions of the predicted travel road and the travelling conditions of other vehicles travelling around the vehicle V. Specifically, the surrounding conditions around the vehicle V include, for example, tracking histories, travelling environments, and surrounding-vehicle behaviors.

The tracking history for each of other vehicles travelling around the vehicle V represents, for example, information indicative of whether a corresponding one of the other vehicles was selected as a target vehicle that the vehicle V tracks.

The travelling environments include, for example, the lane-type of the predicted travel road recognized in step S130.

For example, the surrounding-vehicle behaviors include at least one of

1. The behaviors of at least one preceding vehicle travelling on the predicted travel land of the vehicle V 2. The behaviors of at least one adjacent vehicle travelling on lanes adjacent to the predicted travel lane of the vehicle V 3. The behaviors of at least one merging vehicle travelling on a merging lane merging with the predicted travel lane of the vehicle V.

The CPU 43 according to this embodiment recognizes other vehicles travelling around the vehicle V using the images picked up by the image pickup unit 7. Then, the CPU 43 monitors movement information associated with the movements of the recognized other vehicles, and recognizes, based on the monitored movement information about the recognized other vehicles, the behaviors of one or more preceding vehicles, one or more adjacent vehicles, and/or one or more merging vehicles.

Note that the movement information associated with the movements of each of the recognized other vehicles around the vehicle V includes at least (1) The orientations of the movements of a corresponding one of the other vehicles in the vehicle width direction (2) The distances of the movements of a corresponding one of the other vehicles in the vehicle width direction (3) The variations in lateral velocity of a corresponding one of the other vehicles in the vehicle width direction.

That is, the movement information associated with the movements of each of the recognized other vehicles around the vehicle V includes the variations in the same-lane probability of a corresponding one of the recognized other vehicles.

Next, how the CPU 43 corrects the at least one target-vehicle selecting condition for at least one of other vehicles travelling around the vehicle V in step S170 will be described hereinafter.

Specifically, as the correction in step S170, the CPU 43 increases the probability of at least one of the other vehicles being selected as a target vehicle that the vehicle V tracks; the at least one of the other vehicles was selected as a target vehicle at least once. This is because another vehicle, which was selected as a target vehicle at least once, can be easily selected again as a target vehicle that the vehicle V tracks.

In addition, as the correction in step S170, the CPU 43 increases the probability of at least one of the other vehicles being selected as a target vehicle that the vehicle V tracks; the behavior of the at least one of the other vehicles shows trying to make a lane-change to the predicted travel lane of the vehicle V.

Moreover, in step S170, when it is determined that the predicted travel road has a curved shape, and the predicted travel road allows lane changes (see FIG. 4A), the CPU 43 corrects the at least one target-vehicle selecting condition for adjacent vehicles included in the other vehicles to thereby make it difficult for the adjacent vehicles to be selected as a target vehicle that the vehicle V tracks.

Figure 4A:
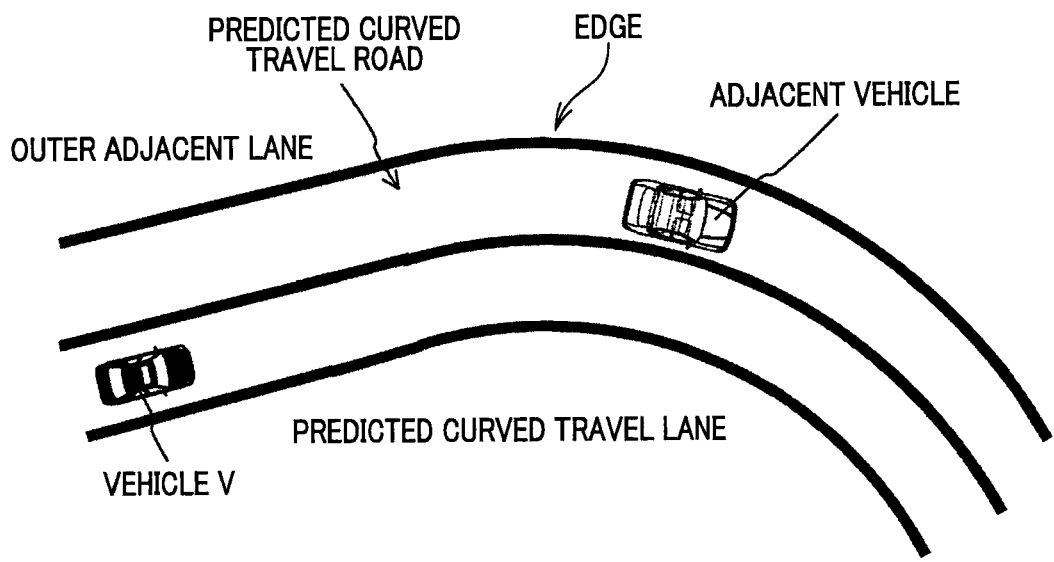
FIG. 4A is an example of the shape of a predicted travel road according to the embodiment.
Figure 4B:
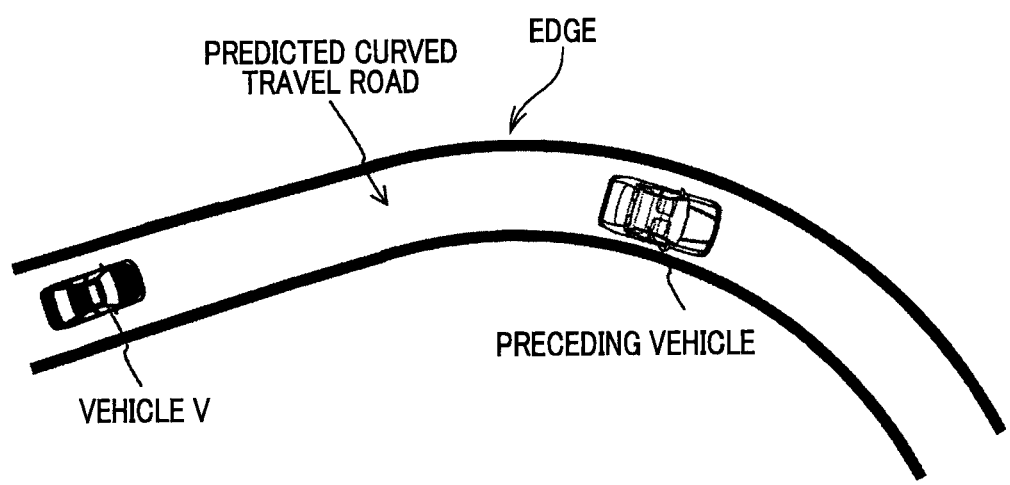
FIG. 4B is another example of the shape of a predicted travel road according to the embodiment.

In step S170, let us assume the situation that the vehicle V is travelling at an edge, i.e. a curve, of the predicted curved travel lane while the preceding vehicle, which is travelling at the edge of the predicted curved travel line ahead of the vehicle V, is being selected as a target vehicle that the vehicle V tracks (see FIG. 4B). In this situation, the CPU 43 corrects the at least one target-vehicle selecting condition for the preceding vehicle to thereby increase the probability of the preceding vehicle travelling ahead of the vehicle V being continuously selected as a target vehicle that the vehicle V tracks in step S170. Particularly, even if it is determined that the predicted travel road does not allow lane changes, the CPU 43 corrects the at least one target-vehicle selecting condition for the preceding vehicle to thereby increase the probability of the preceding vehicle travelling ahead of the vehicle V being continuously selected as a target vehicle that the vehicle V tracks in step S170.

Note that the CPU 43 according to this embodiment is configured to perform correction of the at least one target-vehicle selecting condition for at least one of other vehicles travelling around the vehicle V according to the surrounding conditions around the vehicle V after the operation in step S150 or S160. The present disclosure is however not limited to the configuration.

Specifically, the CPU 43 can be configured to perform correction of the at least one target-vehicle selecting condition for at least one of other vehicles without execution of the operation in step S150 or S160.

Next, specific examples of how the CPU 43 changes the at least one target-vehicle selecting condition in step S150 or S160, or corrects the at least one target-vehicle selecting condition in step S170 will be more specifically described hereinafter with reference to FIGS. 5A to 5C.

In each of FIGS. 5A to 5C, the vertical axis shows the same-lane probability of one of other vehicles travelling around the vehicle V, and the horizontal axis shows time. As described above, the same-lane probability of each of other vehicles travelling around the vehicle V depends on at least (1) The distance of movement of a corresponding one of the other vehicles close to the predicted travel lane of the vehicle V in the vehicle width direction (2) The lateral velocity of movement of a corresponding one of the other vehicles close to the predicted travel lane of the vehicle V in the vehicle width direction.

In addition, the same-lane probability of a preceding vehicle travelling on the predicted travel lane ahead of the vehicle V depends on at least 1. The distance of movement of the preceding vehicle close to an adjacent lane adjacent to the predicted travel lane in the vehicle width direction 2. The lateral velocity of movement of the preceding vehicle close to the adjacent lane in the vehicle width direction.

FIG. 5A illustrates a predetermined standard change curve of the same-lane probability of an adjacent vehicle travelling on an adjacent lane adjacent to a predicted travel lane of the vehicle V while the adjacent vehicle is wobbling in the vehicle width direction (see FIG. 3C).

The standard change curve of the same-lane probability of an adjacent vehicle illustrated in FIG. 3C substantially matches with a predetermined standard change curve of the same-lane probability of an adjacent vehicle that is travelling on a predicted curved travel road (see FIG. 4A).

Specifically, in FIG. 4A, the vehicle V is travelling at an edge of an inner predicted curved travel lane of the predicted curved travel road while an adjacent vehicle is travelling at an edge of an outer adjacent lane of the predicted curved travel road ahead of the vehicle V. Information indicative of the predetermined standard change curve of the same-lane probability of an adjacent vehicle illustrated in FIG. 5A is for example stored in, for example, the ROM 41.

FIG. 5B illustrates a predetermined standard change curve of the same-lane probability of a preceding vehicle travelling on a predicted travel lane of the vehicle V ahead of the vehicle V when the predicted travel lane is a curve lane (see FIG. 4B).

Specifically, in FIG. 4B, the vehicle V is travelling at an edge of the predicted curved travel lane while the preceding vehicle is travelling at the edge of the predicted curved travel line ahead of the vehicle V, so that the preceding vehicle is being selected as a target vehicle that the vehicle V tracks. Information indicative of the predetermined standard change curve of the same-lane probability of a preceding vehicle illustrated in FIG. 5B is for example stored in, for example, the ROM 41.

FIG. 5C illustrates a predetermined standard change curve of the same-lane probability of a merging vehicle travelling a merging lane merging with a predicted travel lane of the vehicle V when the merging lane tries to merge with the predicted travel lane (see FIG. 3A).

The predetermined standard curve of the same-lane probability of a merging vehicle substantially matches with a predetermined standard change curve of the same-lane probability of an adjacent vehicle travelling an adjacent lane of a predicted travel lane of the vehicle V when the adjacent vehicle tries to cut into the predicted travel lane (see FIG. 3B).

Information indicative of the predetermined standard change curve of the same-lane probability of each of a merging vehicle and an adjacent vehicle illustrated in FIG. 5C is for example stored in, for example, the ROM 41.

In each of FIGS. 5A to 5C, reference character TH represents a current value of the threshold probability.

As illustrated in FIG. 5C, because a merging vehicle or an adjacent vehicle (see FIG. 3A or 3B) tries to cut into the predicted travel lane of the vehicle V ahead of the vehicle V, the same-lane probability of the merging vehicle or the adjacent vehicle linearly increases. Thus, when the same-lane probability of the merging vehicle or the adjacent vehicle (see FIG. 3A or 3B) becomes equal to or more than the current value TH of the threshold probability at time t1, the merging vehicle of the adjacent vehicle can be selected as a target vehicle that the vehicle V tracks.

In contrast, as illustrated in FIG. 3C, if an adjacent vehicle is wobbling in the vehicle width direction, the standard curve change of the same-lane probability of a wobbling adjacent vehicle has a positive peak at which the wobbling adjacent vehicle is the closest to the predicted travel lane of the vehicle V (see tp in FIG. 5A).

Thus, if the current value TH of the threshold probability was kept for the case illustrated in FIG. 5C, the wobbling adjacent vehicle could be erroneously selected as a target vehicle that the vehicle V tracks at time t2 although the wobbling adjacent vehicle should be legally prohibited from cutting into the predicted travel lane of the vehicle V (see FIG. 5A).

In order to address such a problem, the CPU 43 according to this embodiment is programmed to, for example, increase the threshold probability up to a value TH1 higher than the positive peak of the standard predetermined standard curve of the same-lane probability of such a wobbling adjacent vehicle illustrated in FIG. 5A in step S160. This makes it difficult for the wobbling adjacent vehicle to be selected as a target vehicle that the vehicle V tracks.

Similarly, as illustrated in FIG. 4A, when the adjacent vehicle is travelling at the edge of the outer adjacent lane of the predicted curved road, the same-lane probability of the adjacent vehicle likely increases. This results in the standard curve change of the same-lane probability of such an adjacent vehicle having a positive peak at which the adjacent vehicle is travelling at the edge of the outer adjacent lane of the predicted curved road (see tp in FIG. 5A).

Thus, if the current value TH of the threshold probability was kept for the case illustrated in FIG. 5C, the adjacent vehicle could be erroneously selected as a target vehicle that the vehicle V tracks at time t2 although the adjacent vehicle does not try to cut into the predicted travel lane of the vehicle V (see FIG. 5A).

In order to address such a problem, the CPU 43 according to this embodiment is programmed to, for example, increase the threshold probability up to the value TH1 higher than the positive peak of the standard predetermined standard curve of the same-lane probability of such an adjacent vehicle illustrated in FIG. 5A in step S160 or S170. This makes it difficult for the adjacent vehicle to be selected as a target vehicle that the vehicle V tracks.

As illustrated in FIG. 4B, when the preceding vehicle is travelling at the edge of the predicted curved travel lane ahead of the vehicle V, the same-lane probability of the preceding vehicle likely decreases. This results in the standard curve change of the same-lane probability of such a preceding vehicle having a negative peak at which the preceding vehicle is travelling at the edge of the predicted curved lane (see tp in FIG. 5B).

Thus, if the current value TH of the threshold probability was kept for the case illustrated in FIG. 5C, the preceding vehicle could be erroneously unselected as a target vehicle that the vehicle V tracks at time t3 although the preceding vehicle does not try to make a lane-change from the predicted travel lane of the vehicle V to an adjacent lane adjacent to the predicted travel lane (see FIG. 5B).

In order to address such a problem, the CPU 43 according to this embodiment is programmed to, for example, decrease the threshold probability down to a value TH2 lower than the negative peak of the standard predetermined standard curve of the same-lane probability of such a preceding vehicle illustrated in FIG. 5B in step S160 or S170. This makes possible that the preceding vehicle is continuously selected as a target vehicle that the vehicle V tracks.

On the other hand, in order to prevent a wobbling adjacent vehicle from being selected as a target vehicle that the vehicle V tracks, a value THA of the threshold probability may be set to be a relatively high value (see FIG. 5D). However, in this case, the timing at which the same-lane probability of a merging vehicle or an adjacent vehicle illustrated in FIG. 3A or 3B becomes equal to or higher than the value THA of the threshold probability at time t1A may be delayed as compared to the aforementioned case illustrated in FIG. 5C. This may result in a driver of the vehicle V having an uncomfortable feeling.

In order to address such a problem, the CPU 43 according to this embodiment is programmed to, for example, decrease the threshold probability down to a value TH3 lower than the value THA in step S170. This makes possible that the timing, at which the same-lane probability of a merging vehicle or an adjacent vehicle illustrated in FIG. 3A or 3B becomes equal to or higher than the value THA of the threshold probability, is earlier than the time t1A. This prevents a driver of the vehicle V from having an uncomfortable feeling.

Following step S170, the CPU 43 performs one of (1) A first determination of whether one of the other vehicles travelling around the vehicle V satisfies the at least one target-vehicle selecting condition if the vehicle V is not tracking another vehicle (step 180a)

(2) A second determination of whether a preceding vehicle continuously satisfies the at least one target-vehicle selecting condition if the vehicle V is tracking the preceding vehicle (step S180b).

When it is determined that one of the other vehicles travelling around the vehicle V satisfies the at least one target-vehicle selecting condition if the vehicle V is not tracking another vehicle (YES in step S180a), the CPU 43 selects one of the other vehicles as a target vehicle that the vehicle V tracks in step S180c.

Otherwise, when it is determined that none of the other vehicles travelling around the vehicle V satisfies the at least one target-vehicle selecting condition if the vehicle V is not tracking another vehicle (NO in step S180a), the CPU 43 terminates the drive assist task in step S180d.

On the other hand, when it is determined that the preceding vehicle continuously satisfies the at least one target-vehicle selecting condition if the vehicle V is tracking the preceding vehicle (YES in step S180b), the CPU 43 continuously selects the preceding vehicle as the target vehicle that the vehicle V tracks in step S180e.

Otherwise, when it is determined that the preceding vehicle does not continuously satisfy the at least one target-vehicle selecting condition if the vehicle V is tracking the preceding vehicle (NO in step S180b), the CPU 43 performs the first determination set forth above, i.e. the operations in steps S180a, 180c, and 180d).

Next, the CPU 43 performs, as an example of drive assist control, adaptive cruise control included in the drive assist task for the target vehicle that the vehicle V tracks in step S190.

If no other vehicles satisfy the at least one target-vehicle selecting condition in step S190, the CPU 43 can perform cruise control that automatically controls the speed of the vehicle V such that the speed of the vehicle V is maintained at a steady speed set by a driver of the vehicle V.

Specifically, the CPU 43 according to this embodiment outputs instructions for performing adaptive cruise control to the engine ECU 22 and/or the brake ECU 24. The instructions cause the engine ECU 22 to control the throttle actuator TA, and/or cause the brake ECU 24 to control the first and second actuators AN1 and AN2 to thereby keep the distance from the vehicle V to the target vehicle to a predetermined target distance or thereabout.

When no other vehicles satisfy the at least one target-vehicle selecting condition in step S190, the CPU 43 outputs instructions for performing cruise control to the engine ECU 22 and/or the brake ECU 24. The instructions cause the engine ECU 22 to control the throttle actuator TA, and/or cause the brake ECU 24 to control the first and second actuators AN1 and AN2 to thereby maintain the speed of the vehicle V at the steady speed set by a driver of the vehicle V.

In addition, while executing the adaptive cruise control or cruise control, the CPU 43 outputs, to the meter ECU 26, various pieces of information about the adaptive cruise control or cruise control being executed in step S190. When receiving the various pieces of information about the adaptive cruise control or the cruise control, the meter ECU 26 displays the pieces of information about the adaptive cruise control or cruise control being executed on the one or more meter displays MD. In step S190, the CPU 43 outputs, to the meter ECU 26, instructions for visibly and/or audibly generating a warning when one or more predetermined conditions for generating a warning are satisfied. When receiving the instructions, the meter ECU 26 outputs a visible and/or audible warning from the one or more meter displays MD.

After the operation in step S190, the CPU 43 terminates the current cycle of the drive assist task, and waits until the next launching timing for the next cycle of the drive assist task arrives.

As described above, the drive assist ECU 40, which serves as an apparatus for controlling the vehicle V to track another vehicle according to this embodiment, is configured to recognize the environments of a predicted travel road of the vehicle V (see steps S110 to S130) using at least one of (i) The digital data indicative of the predicted-road information sent from the predicted-road condition detector 3

(ii) The digital data of the vehicle-condition signals output from the vehicle-condition detector 10.

The drive assist ECU 40 is also configured to determine whether lane changes are possible in the predicted travel road using the environments of the predicted travel road (see step S140).

The drive assist ECU 40 is further configured to adjust the at least one target-vehicle selecting condition based on a result of the determination (see step S150 or S160).

Specifically, when it is determined that lane changes are possible in the predicted travel road (YES in step S140), the drive assist ECU 40 is configured to change the at least one target-vehicle selecting condition such that other vehicles running around the vehicle V are more selectable as a target vehicle that the vehicle V tracks (see step S150).

Otherwise, when it is determined that lane changes are not possible in the predicted travel road (NO in step S140), the drive assist ECU 40 is configured to change the at least one target-vehicle selecting condition such that other vehicles running around the vehicle V are less selectable as a target vehicle that the vehicle V tracks (see step S160).

In addition, the drive assist ECU 40 is configured to recognize the surrounding conditions around the predicted travel road, and correct the at least one target-vehicle selecting condition based on the recognized surrounding conditions around the predicted travel road (see step S170).

Thereafter, the drive assist ECU 40 is configured to select one of the other vehicles travelling around the vehicle V as a target vehicle that the vehicle V tracks; the selected one of the other vehicles satisfies the at least one target-vehicle selecting condition (see step S180). After determination of the target vehicle, the drive assist ECU 40 is configured to perform adaptive cruise control for the target vehicle (see step S190).

Specifically, if the environments of the predicted travel road of the vehicle V show the first lane-type of the combination of the predicted travel lane and the merging lane (see FIG. 3A), the drive assist ECU 40 recognizes that a merging vehicle travelling on the merging lane is enabled to make a lane-change (see steps S130 and S140 in FIG. 2). Then, the drive assist ECU 40 changes, i.e. relaxes, the at least one target-vehicle selecting condition such that the merging vehicle is more selectable as a target vehicle that the vehicle V tracks (see step S150).

Similarly, if the environments of the predicted travel road of the vehicle V show the second lane-type of the combination of the predicted travel lane and an adjacent lane from which a vehicle adjacent to the vehicle V can legally and physically make a lane-change to the predicted travel lane (see FIG. 3B), the drive assist ECU 40 recognizes that an adjacent vehicle travelling on the adjacent lane is enabled to make a lane-change (see steps S130 and S140 in FIG. 2). Then, the drive assist ECU 40 changes, i.e. relaxes, the at least one target-vehicle selecting condition such that the adjacent vehicle is more selectable as a target vehicle that the vehicle V tracks (see step S150).

On the other hand, if the environments of the predicted travel road of the vehicle V show the third lane-type of the combination of the predicted travel lane and an adjacent lane from which a vehicle adjacent to the vehicle V is legally or physically prohibited from making a lane-change to the predicted travel lane (see FIG. 3C), the drive assist ECU 40 recognizes that an adjacent vehicle travelling on the adjacent lane is unable to make a lane-change (see steps S130 and S140 in FIG. 2). Then, the drive assist ECU 40 changes, i.e. tightens, the at least one target-vehicle selecting condition such that the adjacent vehicle is less selectable as a target vehicle that the vehicle V tracks (see step S160).

That is, the drive assist ECU 40 changes the at least one target-vehicle selecting condition to thereby increase the probability of other vehicles running around the vehicle V being selected as a target vehicle that the vehicle V tracks when it is determined that the environments of the predicted travel road allow lane changes. In addition, the drive assist ECU 40 changes the at least one target-vehicle selecting condition to thereby decrease the probability of other vehicles running around the vehicle V being selected as a target vehicle that the vehicle V tracks when it is determined that the environments of the predicted travel road do not allow lane changes.

When an adjacent vehicle or a merging vehicle is travelling on an adjacent lane or a merging lane in the predicted travel road where lane changes are allowed, which tries to cut ahead of the vehicle V, the drive assist ECU 40 results in the adjacent vehicle or merging vehicle being selected as a target vehicle that the vehicle V tracks as early as possible.

In contrast, when an adjacent vehicle is travelling on an adjacent lane in the predicted travel road where lane changes are prohibited, the drive assist ECU 40 prevents the adjacent vehicle from being selected as a target vehicle that the vehicle V tracks even if the adjacent vehicle is wobbling.

Thus, the drive assist ECU 40 results in an improvement of the accuracy of determining another vehicle as a target vehicle that the vehicle V tracks, thus providing proper drive assist to drivers without the drivers having uncomfortable feeling due to improper selection of another vehicle as a target vehicle that the vehicle V tracks.

Additionally, the drive assist ECU 40 is configured to correct the at least one target-vehicle selecting condition based on the recognized surrounding conditions around the predicted travel road of the vehicle V. Particularly, the drive assist ECU 40 corrects the at least one target-vehicle selecting condition according to the tracking histories for other vehicles travelling around the vehicle V, the travelling environments including the lane-type of the predicted travel road, and the surrounding-vehicle behaviors. Thus, the corrected at least one target-vehicle selecting condition is properly determined according to the tracking histories for other vehicles travelling around the vehicle V, the travelling environments including the lane-type of the predicted travel road, and the surrounding-vehicle behaviors.

Specifically, when it is determined that the predicted travel road has a curved shape, and the predicted travel road allows lane changes (see FIG. 4A), the drive assist ECU 40 corrects the at least one target-vehicle selecting condition to thereby make it difficult for adjacent vehicles to be selected as a target vehicle that the vehicle V tracks. This prevents the adjacent vehicle, which is travelling at the edge of the outer adjacent lane of the predicted curved road, from being erroneously selected as a target vehicle that the vehicle V tracks.

In addition, when it is determined that the vehicle V is travelling at an edge of the predicted curved travel lane while the preceding vehicle, which is travelling at the edge of the predicted curved travel line ahead of the vehicle V, is being selected as a target vehicle that the vehicle V tracks, the drive assist ECU 40 corrects the at least one target-vehicle selecting condition. This correction makes possible that the preceding vehicle is continuously selected as a target vehicle that the vehicle V tracks. This provides proper drive assist to drivers without the drivers having uncomfortable feeling due to missing of the preceding vehicle as a target vehicle that the vehicle V tracks.

As described above, the drive assist ECU 40 properly determines the at least one target-vehicle selecting condition according to the surrounding conditions around the predicted travel road of the vehicle V.

This embodiment of the present disclosure has been described, but the present disclosure is not limited to the aforementioned embodiment. The embodiment can be modified within the scope of the present disclosure.

For example, in step S170, the CPU 43 increases the probability of at least one of the other vehicles being selected as a target vehicle that the vehicle V tracks; the at least one of the other vehicles was selected as a target vehicle at least once. The present disclosure is however not limited to the above-described correction.

Specifically, in step S170, the CPU 43 can maintain or decrease the probability of the at least one of the other vehicles being selected as a target vehicle that the vehicle V tracks according to the surrounding conditions around the predicted travel road of the vehicle V.

In step S170, the CPU 43 increases the probability of at least one of the other vehicles being selected as a target vehicle that the vehicle V tracks; the behavior of the at least one of the other vehicles shows trying to make a lane-change to the predicted travel lane of the vehicle V. The present disclosure is however not limited to the correction.

Specifically, in step S170, the CPU 43 can maintain the probability of the at least one of the other vehicles according to the surrounding conditions around the predicted travel road of the vehicle V.

In step S170, when it is determined that the predicted travel road has a curved shape, and the predicted travel road allows lane changes (see FIG. 4A), the CPU 43 corrects the at least one target-vehicle selecting condition to thereby make it difficult for adjacent vehicles to be selected as a target vehicle that the vehicle V tracks. The present disclosure is however not limited to the correction.

Specifically, in step S170, when it is determined that the predicted travel road has a curved shape, and the predicted travel road allows lane changes (see FIG. 4A), the CPU 43 can perform maintaining the at least one target-vehicle selecting condition according to the surrounding conditions around the predicted travel road of the vehicle V.

In step S170, in the situation that the vehicle V is travelling at an edge of the predicted curved travel lane while the preceding vehicle, which is travelling at the edge of the predicted curved travel line ahead of the vehicle V, is being currently selected as a target vehicle that the vehicle V tracks (see FIG. 4B), the CPU 43 increases the probability of the preceding vehicle travelling ahead of the vehicle V being continuously selected as a target vehicle that the vehicle V tracks. The present disclosure is however not limited to the correction.

Specifically, in the situation illustrated in FIG. 4B, the CPU 43 can maintain the probability of the preceding vehicle travelling ahead of the vehicle V being continuously selected as a target vehicle that the vehicle V tracks according to the surrounding conditions around the predicted travel road of the vehicle V.

In step S190, the CPU 43 performs, as an example of drive assist control, adaptive cruise control included in the drive assist task for the target vehicle that the vehicle V tracks, but the present disclosure is however not limited thereto.

Specifically, in step S190, the CPU 43 of a drive assist system according to a modification of the present disclosure can perform, as an example of drive assist control, a modified adaptive cruise control included in the drive assist task for the target vehicle that the vehicle V tracks.

FIG. 6 schematically illustrates a routine indicative of the modified adaptive cruise control in step S190a executed by the CPU 43 after the operation in step S180.

Specifically, following step S180, the CPU 43 determines whether the predicted travel road allows lane changes using the environments of the predicted travel road in step S310; the environments of the predicted travel road were recognized in step S130.

When it is determined that lane changes are difficult in the predicted travel road (NO in step S310), the CPU 43 performs the adaptive cruise control described in step S190 of FIG. 2, and terminates the drive assist task after completion of the operation in step S190.

Otherwise, when it is determined that the predicted travel road allows lane changes (YES in step S310), the CPU 43 determines whether the behaviors of at least one adjacent vehicle recognized in step S170 show that the at least one adjacent vehicle is travelling over both the predicted travel lane and an adjacent lane in step S320.

When it is determined that the behaviors of at least one adjacent vehicle recognized in step S170 do not show that the at least one adjacent vehicle is travelling over both the predicted travel lane and an adjacent lane (NO in step S320), the CPU 43 performs the adaptive cruise control described in step S190 of FIG. 2. Then, the CPU 43 terminates the drive assist task after completion of the operation in step S190.

Otherwise, when it is determined that the behaviors of at least one adjacent vehicle recognized in step S170 show that the at least one adjacent vehicle is travelling over both the predicted travel lane and an adjacent lane (YES in step S320), the CPU 43 limits acceleration of the vehicle V in step S330. For example, the acceleration limiting control executed in step S330 is configured to control, for example, the throttle actuator TA via the engine ECU 22, thus limiting or prohibiting acceleration of the vehicle V. Specifically, the CPU 43 can perform the adaptive cruise control described in step S190 of FIG. 2 while performing the acceleration limiting control in step S330.

After completion of the operation in step S330, the CPU 43 terminates the drive assist task.

As described above, the drive assist ECU 40 according to the modification is configured to perform the acceleration limiting task to limit or prevent acceleration of the vehicle V when it is determined that the predicted travel road allows lane changes. This results in improvement of the driving safety of the vehicle V.

Specifically, when it is determined that the predicted travel road allows lane changes, there is a possibility of another vehicle, which is travelling on a lane adjacent to the predicted travel lane of the vehicle V, making a lane change from the adjacent lane to the predicted travel lane ahead of the vehicle V. Thus, if another vehicle travelling on the adjacent lane cut in ahead of the vehicle V from the adjacent lane while the vehicle V was being accelerated, there would be interference with the driving safety of the vehicle V and that of the other vehicle.

In view of the circumstances, the drive assist ECU 40 according to the modification is configured to perform the acceleration limiting control to limit or prevent acceleration of the vehicle V, resulting in improvement of the driving safety of the vehicle V and that of the cutting-in vehicle.

Preferably, the drive assist ECU according to the modification is configured to perform the acceleration limiting task to limit or prevent acceleration of the vehicle V when it is determined that the predicted travel road allows lane changes, and the at least one adjacent vehicle is travelling over both the predicted travel lane and an adjacent lane.

That is, when another vehicle is travelling over the predicted travel lane of the vehicle V and a lane adjacent to the predicted travel lane, there is a high possibility of the other vehicle making lane change from the adjacent lane to the predicted travel lane.

Thus, the drive assist ECU according to the modification is capable of performing the acceleration limiting task to limit or prevent acceleration of the vehicle V when it is determined that at least one adjacent vehicle is travelling over both the predicted travel lane and the adjacent lane. This results in improvement of the driving safety of the vehicle V and that of the cutting vehicle while holding the driver's acceleration intention of the vehicle V as much as possible.

The drive assist ECU according to the modification is configured to perform the acceleration limiting control in step S330 when it is determined that the predicted travel road allows lane changes, and the at least one adjacent vehicle is travelling over both the predicted travel lane and an adjacent lane. The present disclosure is however not limited to the configuration.

Specifically, the CPU 43 of the drive assist system according to the modification can perform deceleration control to decelerate the vehicle V when it is determined that the predicted travel road allows lane changes, and the at least one adjacent vehicle is travelling over both the predicted travel lane and an adjacent lane in step S330. For example, the CPU 43 controls the first and second hydraulic actuators AN1 and AN2 via the brake ECU 24, thus decelerating the vehicle V.

In step S330, the CPU 43 of the drive assist system according to the modification can advance or delay the acceleration timing of the vehicle V in order to prevent the adjacent vehicle cutting into the predicted travel road from having no effect on the vehicle V. In step S330, the CPU 43 can advance or delay the deceleration timing of the vehicle V in order to prevent the adjacent vehicle cutting into the predicted travel road from affecting any adverse effects on the vehicle V.

In step S330, the CPU 43 of the drive assist system according to the modification can output visible and/or audible warnings via the meter displays MD and the meter ECU 26; the visible and/or audible warnings show that an adjacent vehicle is likely cutting ahead of the vehicle V. In step S330, the CPU 43 can advance or delay the output timing of the visible and/or audible warnings in order to prevent the adjacent vehicle cutting into the predicted travel road from having no effect on the vehicle V.

In step S330, the drive assist ECU 40 according to the modification can be configured to change, according to the surrounding conditions around the predicted travel road, one of (1) The acceleration limiting control (2) The deceleration control (3) The control of changing the acceleration or deceleration timing (4) The control of outputting visible and/or audible warnings (5) The control of changing the output timing of the visible and/or audible warnings.

In addition, the drive assist ECU 40 according to each of the embodiment and the modification is configured to separately perform change of the at least one target-vehicle selecting condition, and correction of the at least one target-vehicle selecting condition, but the present disclosure is not limited thereto.

Specifically, FIG. 7 schematically illustrates a part of a modified drive assist task executed by the CPU 43 of the drive assist ECU 40 according to another modification.

As illustrated in FIG. 7, after the operation in step S130, the CPU 43 recognizes surrounding conditions, i.e. surrounding traffic conditions, around the predicted travel road in step S140a (see step S170 in FIG. 2).

Following step S140a, the CPU 43 determines whether the predicted travel road allows lane changes using the environments of the predicted travel road in step S140b (see step S140 in FIG. 2).

Next, the CPU 43 adjusts the at least one target-vehicle selecting condition based on the recognized surrounding conditions and the result of the determination in step S140b in step S200.

For example, as described above, the CPU 43 changes, i.e. tightens, the at least one target-vehicle selecting condition such that other vehicles running around the vehicle V are less selectable as a target vehicle that the vehicle V tracks when it is determined that (1) The predicted travel road does not allow lane changes (2) the vehicle V is not tracking another vehicle.

As another example, as described above, the CPU 43 changes, i.e. relaxes, the at least one target-vehicle selecting condition for a preceding vehicle running ahead of the vehicle V on the same lane to make it easy for the preceding vehicle to be continuously selected as the target vehicle that the vehicle V tracks when it is determined that (1) The predicted travel road does not allow lane changes (2) the vehicle V is currently tracking the preceding vehicle.

The drive assist system according to each of the embodiment and the modifications is configured to change or correct the threshold probability to thereby change or correct the at least one target-vehicle selecting condition, but the present disclosure is not limited to the configuration.

Specifically, the drive assist system according to each of the embodiment and the modifications can be configured to change or correct a value of the same-lane probability of each of the other vehicles travelling around the vehicle V to thereby change or correct the at least one target-vehicle selecting condition of a corresponding one of the other vehicles.

In addition, the drive assist system according to each of the embodiment and the modifications can be configured to change or correct the target-vehicle selecting condition in one of any methods. Specifically, the methods permit the drive assist system to change or correct the at least one target-vehicle selecting condition such that other vehicles running around the vehicle V are less selectable as a target vehicle that the vehicle V tracks when it is determined that the predicted travel road does not allow lane changes.

The drive assist system according to the embodiment is configured to perform adaptive cruise control or cruise control as an example of drive assist control, but the present disclosure is not limited thereto. Specifically, the drive assist system according to each of the embodiment and the modification can be configured to perform assist control for preventing lane departure.

The assist control for preventing lane departure is configured to (1) Recognize the shape of a predicted travel lane on which the vehicle V is predicted to travel, which corresponds to a currently travelling lane of the vehicle V (see, for example, step S130 of FIG. 2)

(2) Keep the vehicle V travelling within the predicted travel lane, thus preventing the vehicle V from departing from the predicted travel lane.

The vehicle-condition detector 10 is equipped with the yaw-rate sensor 12, the wheel speed sensors 14, and the steering-angle sensor 16, but the present disclosure is not limited to the structure. Specifically, the vehicle-condition detector 10 can be equipped with the yaw-rate sensor 12 and the wheel speed sensors 14 so that the steering-angle sensor 16 can be eliminated, or equipped with the wheel speed sensors 14 and the steering-angle sensor 16 so that the yaw-rate sensor 12 can be eliminated. Specifically, the vehicle-condition detector 10 according to the present disclosure is preferably equipped with at least a first sensor for measuring the steering angle of the vehicle V, and a second sensor for measuring the speed of the vehicle V.

From the drive assist system according to each of the embodiment and the modifications, the vehicle-condition detector can be eliminated.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling a vehicle to travel behind another vehicle, the apparatus comprising:

a detector detecting other vehicles existing around the controlled vehicle; and a controller communicably connected to the detector, the controller being configured to:

cause the controlled vehicle to track one of the other vehicles as a target vehicle if one of the other vehicles meets a predetermined target-vehicle selecting condition, the predetermined target-vehicle selecting condition being required for selecting one of the other vehicles as the target vehicle;

recognize an environment of a predicted travel road on which the controlled vehicle is predicted to travel using conditions of the predicted travel road;

determine whether the predicted travel road allows lane changes based on the recognized environment of the predicted travel road; and adjust the target-vehicle selecting condition based on a result of the determination to change the target-vehicle selecting condition to make the selecting of the one of the other vehicles as the target vehicle more difficult when the determination that the predicted travel road does not allow lane changes is made.

2. The apparatus according to claim 1, wherein the controller is configured to change the target-vehicle selecting condition to increase a possibility of each of the other vehicles being selected as the target vehicle when the determination that the predicted travel road allows lane changes is made.

3. The apparatus according to claim 1, wherein the controller is configured to:

recognize surrounding traffic conditions around the predicted travel road; and correct the target-vehicle selecting condition based on the recognized surrounding traffic conditions.

4. The apparatus according to claim 3, wherein the controller is configured to:

have stored therein a tracking history for each of the other vehicles, the tracking history of each of the other vehicles representing whether a corresponding one of the other vehicles was selected as the target vehicle;

recognize the tracking history for each of the other vehicles as the surrounding traffic conditions around the predicted travel road; and correct the target-vehicle selecting condition for each of the other vehicles based on the target history for a corresponding one of the other vehicles.

5. The apparatus according to claim 3, wherein the environment of the predicted travel road includes a shape of the predicted travel road, and the controller is configured to:

recognize the shape of the predicted travel road as the surrounding traffic conditions around the predicted travel road; and correct the target-vehicle selecting condition based on the shape of the predicted travel road.

6. The apparatus according to claim 3, wherein the controller is configured to:

recognize a behavior of each of the other vehicles as the surrounding traffic conditions around the predicted travel road; and correct the target-vehicle selecting condition for each of the other vehicles based on the behavior of a corresponding one of the other vehicles.

7. The apparatus according to claim 1, wherein the controller is configured to limit acceleration of the controlled vehicle when the determination that the predicted travel road allows lane changes is made.

8. The apparatus according to claim 7, wherein, when the controlled vehicle is predicted to travel on a predicted travel lane included in the predicted travel road, the controller is configured to:

recognize a behavior of each of the other vehicles;

determine, based on the behavior of each of the other vehicles, whether at least one of the other vehicles is travelling over both the predicted travel lane and a lane adjacent to the predicted travel lane; and limit acceleration of the controlled vehicle when the determination that:

the predicted travel road allows lane changes is made, and at least one of the other vehicles is travelling over both the predicted travel lane and the lane adjacent to the predicted travel lane is made.

9. The apparatus according to claim 1, wherein, when the controlled vehicle is predicted to travel on a predicted travel lane included in the predicted travel road, the at least one target-vehicle selecting condition includes a condition that a same-lane probability of each of the other vehicles is equal to or higher than a threshold probability, the same-lane probability of each of the other vehicles being defined as a probability that a corresponding one of the other vehicles will travel on the predicted travel lane of the controlled vehicle ahead of the controlled vehicle; and the controller is configured to increase the threshold probability to make it more difficult for the other vehicles to be selected as the target vehicle when the determination that the predicted travel road does not allow lane changes is made.

10. The apparatus according to claim 9, wherein:

the controller is configured to decrease the threshold probability to increase a possibility of each of the other vehicles being selected as the target vehicle when the determination that the predicted travel road allows lane changes is made.

11. The apparatus according to claim 9, wherein:

the detector is configured to detect a position of each of the other vehicles; and the controller is configured to:

recognize, based on the position of each of the other vehicles, a distance of movement of each of the other vehicles close to the predicted travel lane in a width direction of the controlled vehicle; and a lateral velocity of movement of each of the other vehicles close to the predicted travel lane in the width direction of the controlled vehicle; and calculate a value of the same-lane probability of each of the other vehicles based on the recognized distance and lateral velocity of movement of a corresponding one of the other vehicles.

12. The computer program product according to claim 1, wherein the target-vehicle selecting condition is changed to increase a value of a threshold probability required to be met for selecting the one of the other vehicles as the target vehicle.

13. The computer program product according to claim 12, wherein the threshold probability is a same-lane probability that the one of the other vehicles will travel on the predicted travel road on which the controlled vehicle is predicted to travel.

14. A computer program product for an apparatus for controlling a vehicle to track another vehicle, the apparatus including a detector detecting other vehicles existing around the controlled vehicle, the computer program product comprising:

a non-transitory computer-readable storage medium; and a set of computer program instructions embedded in the computer-readable storage medium, the instructions causing a computer to:

cause the controlled vehicle to track one of the other vehicles as a target vehicle if one of the other vehicles meets a predetermined target-vehicle selecting condition, the predetermined target-vehicle selecting condition being required for selecting one of the other vehicles as the target vehicle;

recognize an environment of a predicted travel road on which the controlled vehicle is predicted to travel using conditions of the predicted travel lane;

determine whether the predicted travel road allows lane changes based on the recognized environment of the predicted travel road; and adjust the target-vehicle selecting condition based on a result of the determination to change the target-vehicle selecting condition to make the selecting of the one of the other vehicles as the target vehicle more difficult when a determination that the predicted travel road does not allow lane changes is made.

15. The computer program product according to claim 14, wherein the instructions cause a computer to change the target-vehicle selecting condition to make it more difficult for the other vehicles to be selected as the target vehicle when the determination that the predicted travel road does not allow lane changes is made.

16. The computer program product according to claim 15, wherein the instructions cause a computer to change the target-vehicle selecting condition to increase a possibility of each of the other vehicles being selected as the target vehicle when the determination that the predicted travel road allows lane changes is made.

17. The computer program product according to claim 14, wherein the target-vehicle selecting condition is changed to increase a value of a threshold probability required to be met for selecting the one of the other vehicles as the target vehicle.

18. The computer program product according to claim 17, wherein the threshold probability is a same-lane probability that the one of the other vehicles will travel on the predicted travel road on which the controlled vehicle is predicted to travel.

* * * * *